3,237,492
MACHINE TOOL TRACER
Emile I. Massey, Box 122, R.F.D. 1, Bellows Falls, Vt.
Filed July 15, 1964, Ser. No. 382,730
4 Claims. (Cl. 82—14)

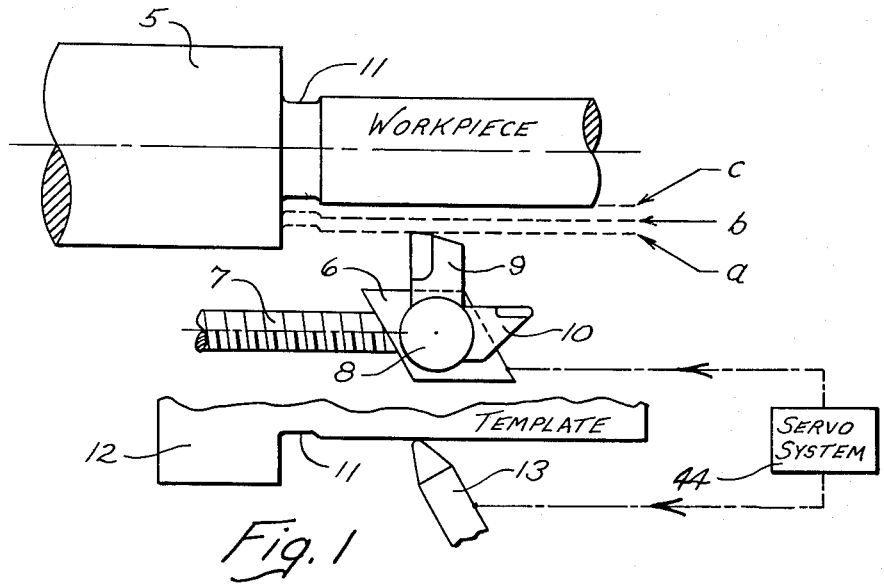
Fig. 1
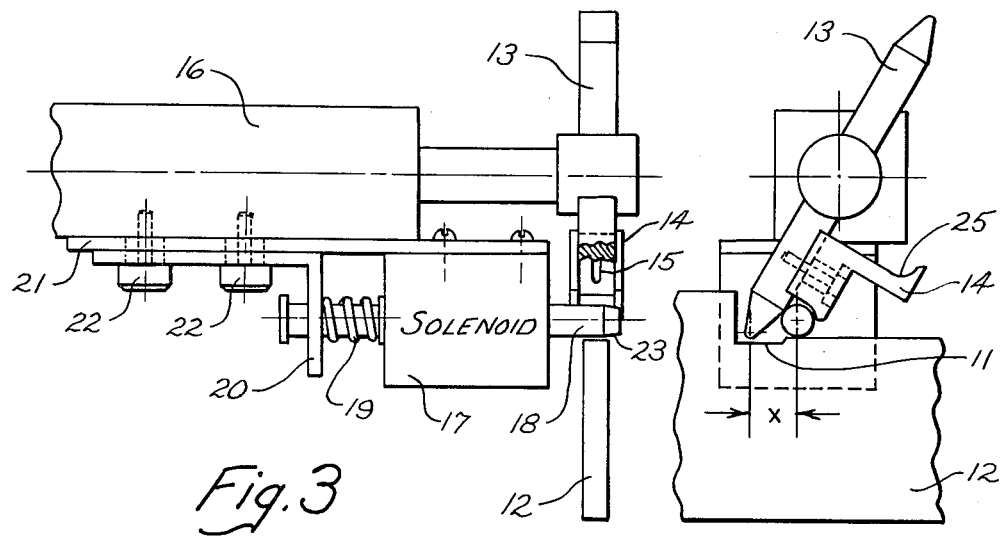
Fig. 3
Fig. 2
EMILE I. MASSEY
INVENTOR.

My invention relates to machine tools and relates more particularly to metal working equipment in which a cutting tool is guided by a template which controls the motion of a tracer device, which device is linked to the tool actuating means through a suitable servo mechanism.

A complete understanding of my invention, which constitutes an improvement on known devices of the type hereinafter described, may be had from the following description and accompanyiny drawing, in which FIGURE 1 is a schematic representation of a tracer controlled cutting tool to illustrate the setting of the invention;

FIGURE 2 is a view in elevation of a stylus unit constructed in accordance with the invention; and FIGURE 3 is a side view of the unit shown in FIGURE 2.

Turning now more particularly to FIGURE 1, I show a workpiece 5 being turned in a typical tracer application. It is common practice to provide a tool carriage 6 which may be actuated along a line of motion parallel to the work axis as by a lead screw 7 or other suitable means. The tool carriage may mount a tool turret 8 on which one or more cutting tools are held and presented serially to the work. The tool 9 is illustrated as a roughing tool designed to remove stock at a relatively high rate. The tool 10 may be a finishing tool designed to produce an acceptable work surface on the last pass of the carriage.

I have for illustrative purposes shown three cutting paths (a), (b), and (c). Paths (a) and (b) may be performed with tool 9, while the finishing cut (c) may be performed with tool 10. It is understood that machines of this type may be programmed to index the correct tool into operative position at the appropriate time.

It is a common requirement to produce "undercuts" or necks in the work at the point where diametral steps are desired. This is shown at 11. A template 12, shown controlling the tool by means of a stylus 13 and servo system 44, must, of course, present to the stylus 13 the desired profile. Therefore a neck at 11 is also shown on the template 12. During cut (a) and cut (b) it is not necessary or even desirable to reproduce the final contour in all its detail. Cutting tool 9, designed with large included angles at the cutting tip, is best adapted to remove stock in heavy cuts. Such a tool, of optimum design for this purpose is usually ill-suited to follow final contour details such as illustrated by the neck at 11.

Nonetheless, in so-called roughing passes, the tool 9 will follow the dictates of the template contour, with cuts (a) and (b) following the dotted lines shown. This limits the design of a roughing tool, whereas it would be advantageous to have a large lead angle to give strength to the tool member.

It has been proposed to have two or more templates, each of optimum contour for a particular pass. Such templates are costly and expensive indexing mechanisms must be provided and controlled.

I propose to modify the stylus in systems of this type to avoid the foregoing difficulties in an inexpensive and expeditious manner. In FIGURE 2 is shown as stylus 13 to which has been added a back-up block 14 held on the stylus by a screw running through an elongated slot 15 as shown. On the stylus arm 16, I mount a solenoid 17 which, when energized, withdraws a plunger 18 against a suitable return spring 19.

The solenoid-plunger assembly is affixed to the stylus arm 16 by means of brackets 20 and 21. By reason of elongated slots in said brackets and adjusting screws 22, the desired relative position of the plunger and the block 14 may be achieved. The plunger 18 is shown in the de-energized position. It is, of course, somewhat loose within the solenoid core, such clearance being necessary to permit axial motion. For this reason, I provide a slight taper 23 at the tip of plunger 18 such that upon the spring return, the plunger may slide past the block 14 to the position shown.

When in the position shown, the plunger 18 rides on the template 5 at the same spatial position relative to the work axis as the tip of stylus 13. There is thus formed, in effect, a much wider stylus nose, being the distance "x." It will be seen then, that when the tip of the stylus 13 comes to a neck at 11, or similar small depression, the device will ride over same and not permit the cutting tool 9 to follow that particular contour detail.

After the required number of roughing cuts, it is merely necessary, through the machine program, to energize solenoid 17 and index the tool carrier to the finish tool 10 position. With the plunger 18 thus withdrawn, the stylus 13, on the finishing pass of the carriage 6, will be able to follow the final desired contour. Small remaining portions of stock in areas such as the neck 11 are easily removed by finishing tool 10 which has the optimum tool geometry for such operations.

The block 14 provides a positive backstop for the plunger 18, and its position is adjustable to insure that the plunger and stylus tip are in the desired relative position. As for dimension "x," this may be chosen in a given case by moving the brackets 20 and 21 along elongated apertures through which the screws 22 run. If this distance is changed significantly, the block 14 may be quickly changed to another which will accommodate the new plunger position. Alternatively the block may be indexed 180 degrees to bring a new plunger engaging surface 25 into operation.

While I have described an embodiment of my invention in the foregoing specification for purposes of illustration, I intend to comprehend variations within the spirit and scope of the following claims:

I claim:
1. A follower device for contacting a template to control a machine tool comprising, a carrier; a stylus mounted on said carrier; a block mounted on said stylus; a movable plunger mounted on said carrier in position between said block and said template and in spaced relation to said stylus along the axis of motion of said carrier; and means to move said plunger out of said position.
2. A device according to claim 1 in which the spacing between said stylus and said plunger is adjustable.
3. A follower device for contacting a template to control the cutting tool of a lathe comprising, a carrier; a stylus mounted on said carrier; a plunger also mounted on said carrier and laterally spaced from said stylus along a line parallel to the axis of said lathe, the template contacting surfaces of said stylus and said plunger being substantially equidistant from said axis; and means to selectively move said plunger into and out of template contacting position.
4. A device according to claim 3 in which the spacing between said stylus and said plunger is adjustable.

References Cited by the Examiner
UNITED STATES PATENTS
3,146,647   9/1964   Bollman _____ 82—14

WILLIAM W. DYER, Jr., Primary Examiner.
G. A. DOST, Assistant Examiner.